(12) United States Patent
Ben-David et al.

(10) Patent No.: US 9,208,785 B2
(45) Date of Patent: Dec. 8, 2015

(54) SYNCHRONIZING DISTRIBUTED SPEECH RECOGNITION

(75) Inventors: Shay Ben-David, Haifa (IL); Charles W. Cross, Jr., Wellington, FL (US)

(73) Assignee: Nuance Communications, Inc., Burlington, MA (US)

( * ) Notice: Subject to any disclaimer, the term of this patent is extended or adjusted under 35 U.S.C. 154(b) by 2385 days.

(21) Appl. No.: 11/382,573

(22) Filed: May 10, 2006

(65) Prior Publication Data

US 2007/0265851 A1 Nov. 15, 2007

(51) Int. Cl.
*G10L 15/00* (2013.01)
*G10L 21/00* (2013.01)
*G10L 25/00* (2013.01)
*G10L 15/30* (2013.01)

(52) U.S. Cl.
CPC ...................... *G10L 15/30* (2013.01)

(58) Field of Classification Search
CPC ......... G10L 15/00; G10L 15/22; G10L 15/24; G10L 15/26; G10L 15/265; G10L 15/28; G10L 15/30; G10L 15/32; G10L 2015/00; G10L 2015/22; G10L 2015/223
USPC ............................... 704/270, 275, 270.1, 231
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Gulau et al. | |
| 5,960,399 A * | 9/1999 | Barclay et al. | 704/270.1 |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,513,011 B1 | 1/2003 | Uwakubo | |
| 6,532,446 B1 * | 3/2003 | King | 704/270.1 |
| 6,604,073 B2 * | 8/2003 | Yoda | 704/231 |
| 6,606,599 B2 | 8/2003 | Grant et al. | |
| 6,801,604 B2 * | 10/2004 | Maes et al. | 379/88.17 |
| 6,856,960 B1 | 2/2005 | Dragosh et al. | |
| 6,920,425 B1 | 7/2005 | Will et al. | |

(Continued)

FOREIGN PATENT DOCUMENTS

CN 1385783 12/2002
CN 1385783 A 12/2002

(Continued)

OTHER PUBLICATIONS

Axelsson, et al.; "XHTML+Voice Profile 1.2" Internet, [Online] Mar. 16, 2004, pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Paras D Shah
(74) *Attorney, Agent, or Firm* — Wolf, Greenfield & Sacks, P.C.

(57) ABSTRACT

Methods, apparatus, and computer program products are disclosed for synchronizing distributed speech recognition ('DSR') that include receiving in a DSR client notification from a voice server of readiness to conduct speech recognition and, responsive to the receiving, transmitting by the DSR client, from the DSR client to the voice server, speech for recognition.

24 Claims, 5 Drawing Sheets

(56) References Cited

U.S. PATENT DOCUMENTS

| | | | |
|---|---|---|---|
| 6,999,930 B1* | 2/2006 | Roberts et al. | 704/270.1 |
| 7,035,805 B1 | 4/2006 | Miller | |
| 7,139,715 B2* | 11/2006 | Dragosh et al. | 704/270.1 |
| 7,150,399 B2 | 12/2006 | Barrus et al. | |
| 7,162,414 B2* | 1/2007 | Stanford | 704/201 |
| 7,171,243 B2 | 1/2007 | Watanabe et al. | |
| 7,188,067 B2 | 3/2007 | Grant et al. | |
| 7,330,890 B1 | 2/2008 | Partovi et al. | |
| 7,376,586 B1 | 5/2008 | Partovi et al. | |
| 7,409,349 B2* | 8/2008 | Wang et al. | 704/270.1 |
| 7,487,085 B2 | 2/2009 | Cross | |
| 8,494,849 B2* | 7/2013 | Collotta et al. | 704/233 |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184373 A1* | 12/2002 | Maes | 709/228 |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0139930 A1* | 7/2003 | He et al. | 704/270.1 |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0044522 A1* | 3/2004 | Yang et al. | 704/201 |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1* | 7/2004 | Ferrans et al. | 704/270.1 |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt, Jr. | |
| 2005/0091059 A1 | 4/2005 | Lecoeuche | |
| 2005/0125231 A1* | 6/2005 | Lipe et al. | 704/270 |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0079261 A1* | 4/2006 | Nakamura | 455/518 |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0203708 A1* | 8/2007 | Polcyn et al. | 704/270.1 |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO 2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003], Mar. 16, 2004.

PCT Search Report, Jun. 25, 2008; PCT Application No. ; PCT/EP2008/051358.

PCT Search Report, Jun. 18, 2008; PCT Application No. ; PCT/EP2008/051363.

U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.

Axelsson, et al.; "XHTML+Voice Profile 1.2" Internet, [Online] Mar. 16, 2004, pp. 1-53, XP002484188 Retrieved from the Internet: URL: http://www.voicexml.org/specs/mutlimodal/x+v/12/spec.html [retrieved on Jun. 12, 2008 ].

(56) References Cited

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al., Robust Semantic Confidence Scoring ICSLP 2002: 7$^{th}$ International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

* cited by examiner

FIG. 5

SYNCHRONIZING DISTRIBUTED SPEECH RECOGNITION

BACKGROUND OF THE INVENTION

1. Field of the Invention

The field of the invention is data processing, or, more specifically, methods, apparatus, and products for synchronizing distributed speech recognition.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

The performance of speech recognition systems receiving speech that has been transmitted over voice channels, particularly mobile channels, can be significantly degraded when compared to using an unmodified signal. The degradations are as a result of both relatively low bit rate speech coding and channel transmission errors. A Distributed Speech Recognition ('DSR') system addresses these problems by eliminating the speech channel and instead using an error protected data channel to send a parameterized representation of the speech, which is suitable for recognition. The processing is distributed between the terminal ('DSR client') and a voice server. The DSR client performs the feature parameter extraction, or the front-end of the speech recognition function. The speech features then are transmitted over a data channel to a remote "back-end" recognizer on a voice server. This architecture substantially reduces transmission channel effects on speech recognition performance.

Naively connecting a DSR client to a voice server, however, is not without remaining challenges. One troubling issue is that data communications connections for voice, such as, for example, SIP/RTP connections or H.323 connections, typically experience significant delay, delay which itself varies over time. Such delay presents echo effects and also results in an echo from a voice prompt being fed back to the voice server, thereby degrading speech recognition accuracy. Perfect echo removal on the DSR client may mitigate this issue, but perfect echo removal is very difficult to achieve. Estimating the delay, for example, and starting recognition only after the channel delay is problematic because of the stochastic nature of packet switching; the delay varies from packet to packet of speech data.

In addition, when accessing the service over limited bandwidth networks such as cellular networks, it is useful to send a minimal amount of data so as to conserve bandwidth. Voice Activity Detection ('VAD') and discontinuous transmission ('DTX') are prior art methods of conserving bandwidth, but neither is effective unless the voice server is waiting for speech data. A common solution to both problems, echo prevention and bandwidth conservation, is push to talk ('PTT') switching, which sends speech data only when a switch is manually pressed. This solution is not acceptable in many multimodal applications because of user experience issues. X+V provides a <sync> markup element for use in synchronizing the receipt of spoken information and visual elements. The <sync> element, however, is of no use in synchronizing voice server readiness with the beginning of speech from a user for purposes of echo elimination and bandwidth conservation. For all these reasons, therefore, there is therefore an ongoing need for improvement in synchronizing distributed speech recognition.

SUMMARY OF THE INVENTION

Methods, apparatus, and computer program products are disclosed for synchronizing distributed speech recognition ('DSR') that include receiving in a DSR client notification from a voice server of readiness to conduct speech recognition and, responsive to the receiving, transmitting by the DSR client, from the DSR client to the voice server, speech for recognition.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
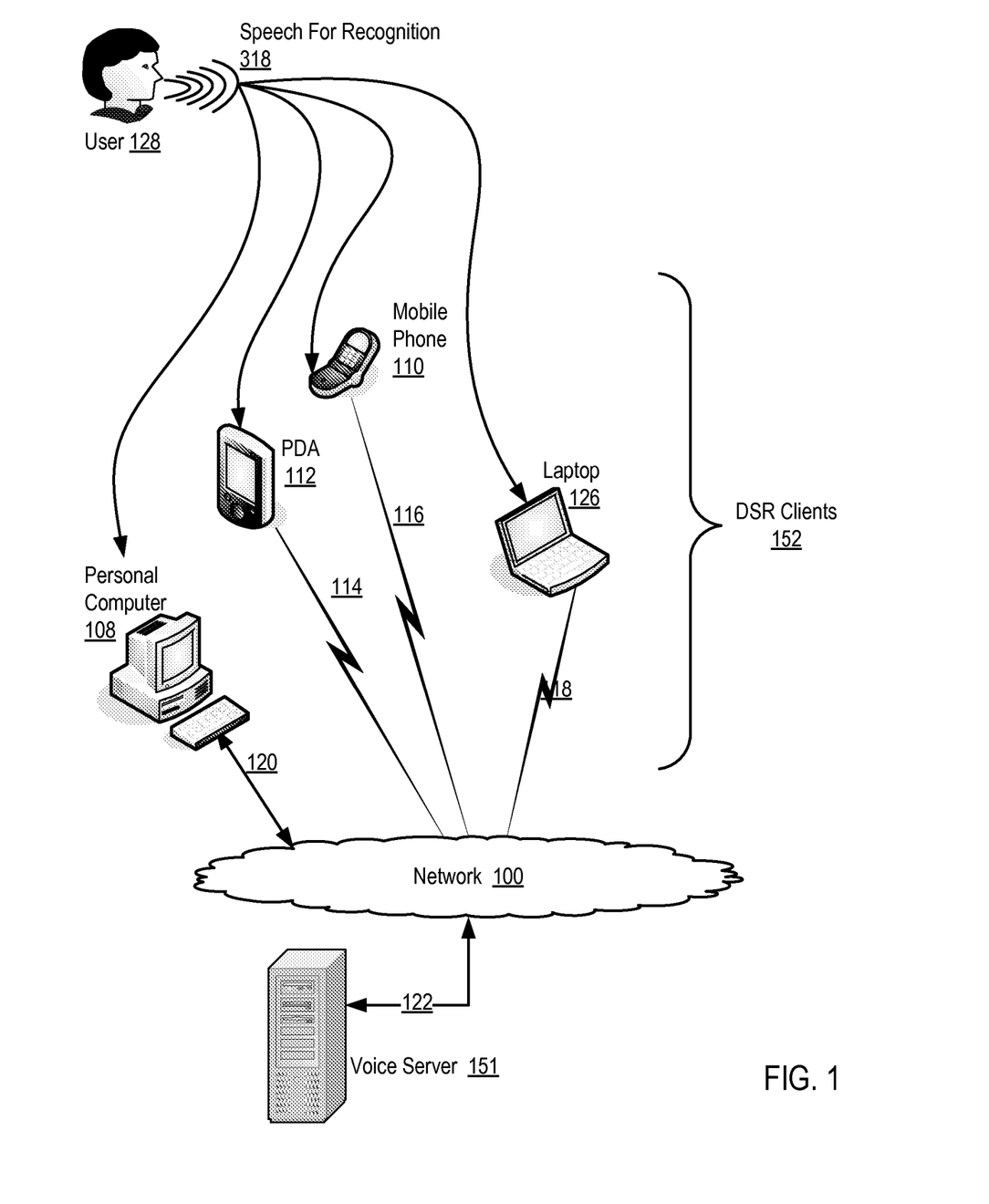
FIG. 1 sets forth a network diagram illustrating an exemplary system for synchronizing distributed speech recognition according to embodiments of the present invention.

Exemplary methods, apparatus, and products for synchronizing distributed speech recognition according to embodiments of the present invention are described with reference to the accompanying drawings, beginning with FIG. 1. FIG. 1 sets forth a network diagram illustrating an exemplary system for synchronizing distributed speech recognition according to embodiments of the present invention. The system of FIG. 1 operates generally to synchronizing distributed speech recognition according to embodiments of the present invention by receiving in a DSR client notification from a voice server of readiness to conduct speech recognition and, responsive to receiving the notification of readiness, transmitting, from the DSR client to the voice server, speech for recognition. A DSR client is an automated device, automated computing machinery, or a computer program running on an automated device, capable of accepting speech input, parameterizing the speech, and transmitting the parameterized speech to a voice server for recognition. A GUI browser on a laptop, a voice browser on a telephone handset, an online game implemented with Java on a personal computer, for example, all may be implemented as DSR clients.

The system of FIG. 1 includes several example DSR clients:
- personal computer (108) which is coupled for data communications to network (100) through wireline connection (120),
- personal digital assistant ('PDA') (112) which is coupled for data communications to network (100) through wireless connection (114),
- mobile telephone (110) which is coupled for data communications to network (100) through wireless connection (116), and
- laptop computer (126) which is coupled for data communications to network (100) through wireless connection (118).

Each of the example DSR clients (152) in the system of FIG. 1 include microphones, audio amplifiers, digital-to-analog converters, and DSR client software modules capable of accepting from a user (128) speech for recognition (318), parameterizing the speech by extracting speech parameters, and transmitting the speech to a voice server for recognition. The DSR clients in this example are also typically capable of employing voice activity detection ('VAD') to distinguish voice activity from non-voice audio signals and identify only the voice activity as speech to be transmitted for recognition. Each of the example DSR clients (152) in the system of FIG. 1 are capable of synchronizing distributed speech recognition according to embodiments of the present invention by receiving notification from a voice server (151) of readiness to conduct speech recognition and, responsive to receiving the notification of readiness, transmitting, from the DSR client to the voice server, speech for recognition. The use of these four example DSR clients (152) is for explanation only, not for limitation of the invention. Any automated computing machinery capable of accepting speech from a user and communicating the speech to a voice server may function as a DSR client according to embodiments of the present invention.

The system of FIG. 1 includes a data communications network (100). A data communications network for synchronizing distributed speech recognition according to embodiments of the present invention is a system of routers connected for data communications. Such a network may be implemented with optical connections, wireline connections, or with wireless connections. Such a network may include intranets, internets, local area networks ('LANs'), and wide area networks ('WANs').

Such a network may implement:
- a link layer with the Ethernet™ Protocol or the Wireless Ethernet™ Protocol,
- a network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), H.323, and
- other protocols as will occur to those of skill in the art.

The system of FIG. 1 also include a voice server (151). Voice server (151) is a computer that runs a multimodal server application program that accepts requests for speech recognition and returns text representing recognized speech. In addition, voice server (151) in this example is improved to synchronize distributed speech recognition according to embodiments of the present invention by transmitting to a DSR client notification of readiness to conduct speech recognition and, after transmitting the notification of readiness, receiving speech for recognition from the DSR client.

The arrangement of the voice server, the DSR clients, and the network making up the exemplary system illustrated in FIG. 1 are for explanation, not for limitation. Data processing systems useful for synchronizing distributed speech recognition according to various embodiments of the present invention may include additional servers, routers, other devices, and peer-to-peer architectures, not shown in FIG. 1, as will occur to those of skill in the art. Networks in such data processing systems may support many data communications protocols in addition to those noted above. Various embodiments of the present invention may be implemented on a variety of hardware platforms in addition to those illustrated in FIG. 1.

Synchronizing distributed speech recognition in accordance with the present invention is generally implemented with one or more voice servers, computers, that is, automated computing machinery, that carry out speech recognition in a distributed speech recognition system. For further explanation, therefore, FIG. 2 sets forth a block diagram of automated computing machinery comprising an example of a computer useful as a voice server (151) in synchronizing distributed speech recognition according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Figure 2:
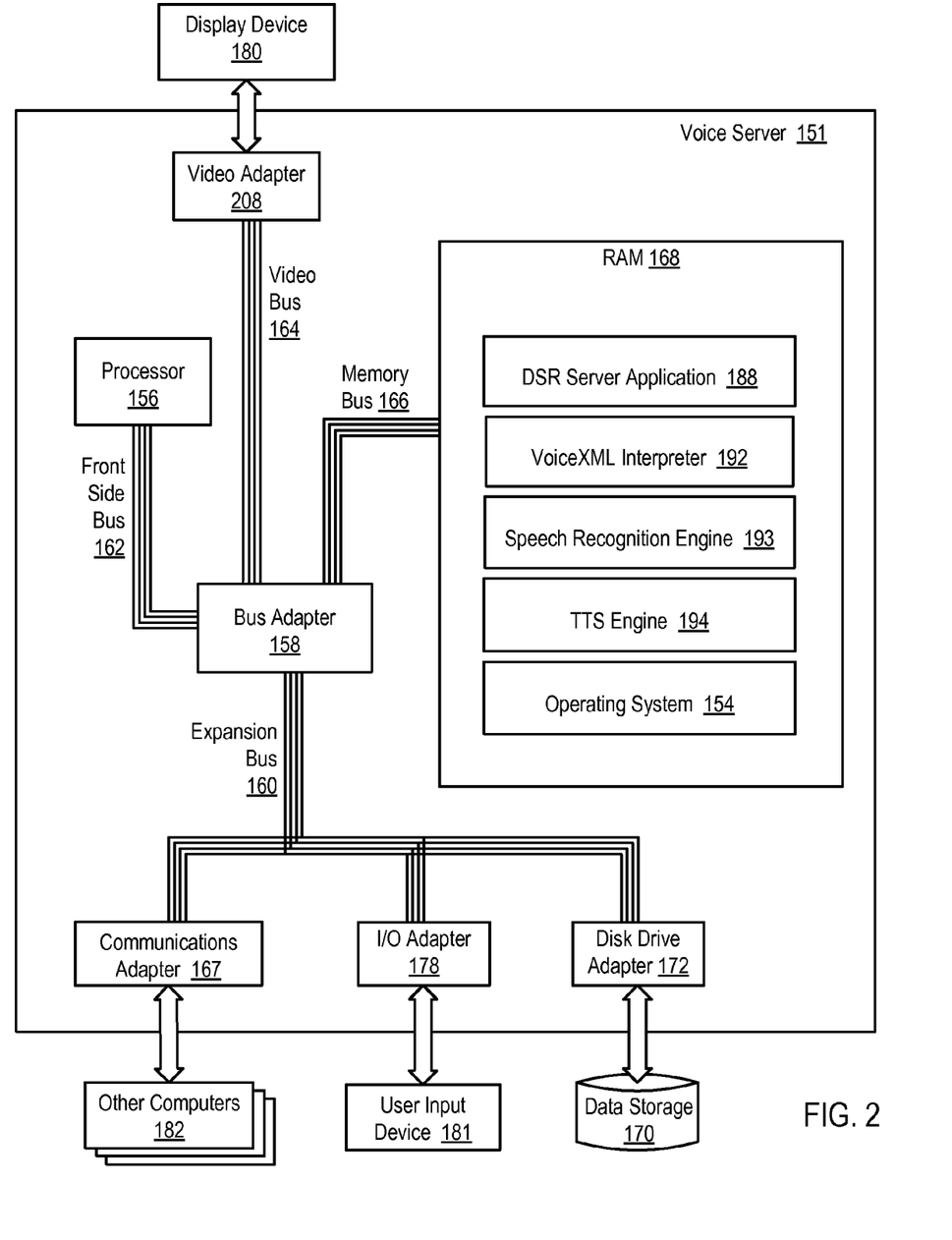
FIG. 2 sets forth a block diagram of automated computing machinery comprising an example of a computer useful as a voice server in synchronizing distributed speech recognition according to embodiments of the present invention.

Stored in RAM (168) is a DSR server application (188), a module of computer program instructions capable of carrying out synchronized distributed speech recognition according to embodiments of the present invention by transmitting to a DSR client notification of readiness to conduct speech recognition and, after transmitting the notification of readiness, receiving speech for recognition from the DSR client. DSR server application (188) typically is user-level, multimodal, server-side computer program. DSR server application (188) may, for example, be implemented with a set of VoiceXML documents which taken together comprise a VoiceXML application. DSR server application (188) may, for example, alternatively be implemented as a web server that supports X+V by providing XHTML responses to HTTP requests from XHTML clients.

Also stored in RAM is a VoiceXML interpreter (192), a module of computer program instructions that parses and executes VoiceXML. VoiceXML input to VoiceXML interpreter (192) may originate from VoiceXML applications or from X+V applications. In this example, VoiceXML interpreter (192) interprets and executes VoiceXML segments provided to VoiceXML interpreter (192) through DSR server application (188).

Also stored in RAM (168) is a speech recognition engine (193), a module of computer program instructions that accepts parameterized speech for recognition as preprocessed by a DSR client, converts the parameterized speech to text, parses the converted speech against a vocabulary or grammar, and returns text representing recognized speech. Also stored in RAM (168) is a Text To Speech ('TTS') Engine (194), a module of computer program instructions that accepts text as input and returns the same text in the form of digitally encoded speech, for use in providing speech as prompts for users of DSR systems.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), DSR server application (188), VoiceXML interpreter (192), speech recognition engine (193), and Text To Speech Engine (194) in the example of FIG. 2 are shown in RAM (168), but many components of such software typically are stored in non-volatile memory also.

Voice server (151) of FIG. 2 includes bus adapter (158), a computer hardware component that contains drive electronics for the high speed buses, the front side bus (162), the video bus (164), and the memory bus (166), as well as for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory space (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes video adapter (208), which is an example of an I/O adapter specially designed for graphic output to a display device such as a display screen or computer monitor. Video adapter (208) is connected to processor (156) through a high speed video bus (164), bus adapter (158), and the front side bus (162), which is also a high speed bus.

The exemplary voice server (151) of FIG. 2 includes a communications adapter (167) for implementing data communications with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Synchronizing distributed speech recognition in accordance with the present invention is generally implemented with one or more DSR clients, computers, that is, automated computing machinery. In the system of FIG. 1, for example, all the DSR clients are implemented to some extent at least as computers. For further explanation, therefore, FIG. 3 sets forth a block diagram of automated computing machinery comprising an example of a computer useful as a DSR client (152) in synchronizing distributed speech recognition according to embodiments of the present invention. The DSR client (152) of FIG. 3 includes at least one computer processor (156) or 'CPU' as well as random access memory (168) ('RAM') which is connected through a high speed memory bus (166) and bus adapter (158) to processor (156) and to other components of the DSR client.

Figure 3:
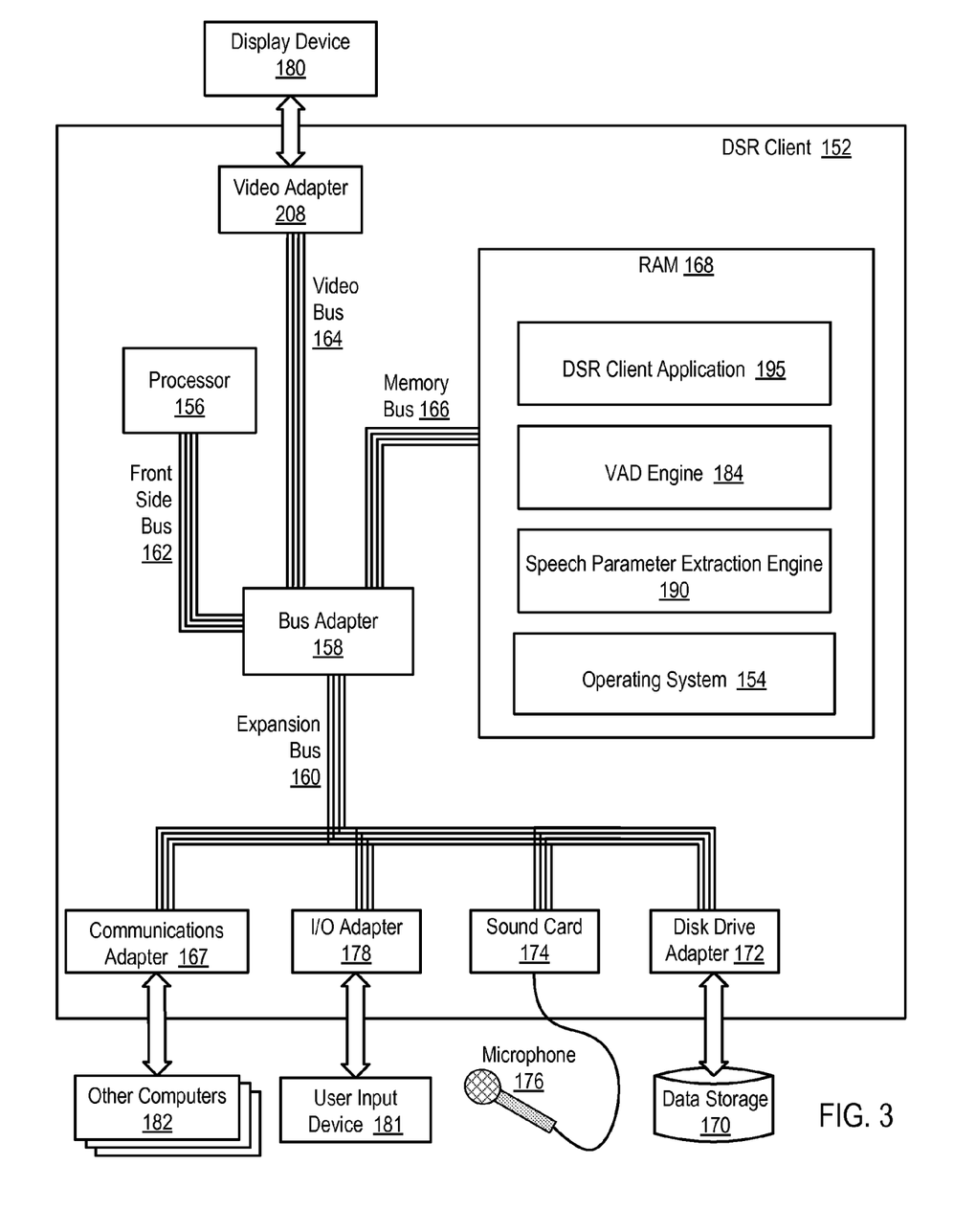
FIG. 3 sets forth a block diagram of automated computing machinery comprising an example of a computer useful as a DSR client in synchronizing distributed speech recognition according to embodiments of the present invention.

Stored in RAM (168) is a DSR client application (195), a module of computer program instructions capable synchronizing distributed speech recognition according to embodiments of the present invention by receiving notification from a voice server of readiness to conduct speech recognition and, responsive to receiving the notification of readiness, transmitting speech for recognition to the voice server. Also stored in RAM (168) is a voice activity detection ('VAD') engine (184), a module of computer program instructions that accepts digitally encoded audio signals from a sound card, employs statistical techniques to filter out portions of the audio signals that represent mere noise or non-voice audio, and provides the filtered speech to the DSR client for transmission to a voice server. Also stored in RAM (168) is a speech parameter extraction engine (190), a module of computer program instructions that accepts digitally encoded speech that has been filtered for voice activity by a VAD engine, extracts from the encoded filtered speech parameters that describe the speech sufficiently to support speech recognition, and provides the parameterized speech to the DSR client for transmission to a voice server.

Also stored in RAM (168) is an operating system (154). Operating systems useful in DSR clients according to embodiments of the present invention include UNIX™, Linux™, Microsoft NT™, AIX™, IBM's i5/OS™, and others as will occur to those of skill in the art. Operating system (154), DSR client application (195), VAD engine (184), and speech parameter extraction engine (190) in the example of FIG. 3 are shown in RAM (168), but many components of such software typically are stored in non-volatile memory also.

DSR client (152) of FIG. 3 includes bus adapter (158), a computer hardware component that contains drive electronics for the high speed buses, the front side bus (162), the video bus (164), and the memory bus (166), as well as for the slower expansion bus (160). Examples of bus adapters useful in DSR clients according to embodiments of the present invention include the Intel Northbridge, the Intel Memory Controller Hub, the Intel Southbridge, and the Intel I/O Controller Hub. Examples of expansion buses useful in DSR clients according to embodiments of the present invention include Industry Standard Architecture ('ISA') buses and Peripheral Component Interconnect ('PCI') buses.

DSR client (152) of FIG. 3 includes disk drive adapter (172) coupled through expansion bus (160) and bus adapter (158) to processor (156) and other components of the DSR client (152). Disk drive adapter (172) connects non-volatile data storage to the DSR client (152) in the form of disk drive (170). Disk drive adapters useful in DSR clients include Integrated Drive Electronics ('IDE') adapters, Small Computer System Interface ('SCSI') adapters, and others as will occur to those of skill in the art. In addition, non-volatile computer memory may be implemented for a DSR client as an optical disk drive, electrically erasable programmable read-only memory space (so-called 'EEPROM' or 'Flash' memory), RAM drives, and so on, as will occur to those of skill in the art.

The example DSR client of FIG. 3 includes one or more input/output ('I/O') adapters (178). I/O adapters in DSR clients implement user-oriented input/output through, for example, software drivers and computer hardware for controlling output to display devices such as computer display screens, as well as user input from user input devices (181) such as keyboards and mice. The example DSR client of FIG. 3 includes video adapter (208), which is an example of an I/O adapter specially designed for graphic output to a display device such as a display screen or computer monitor. Video adapter (208) is connected to processor (156) through a high speed video bus (164), bus adapter (158), and the front side bus (162), which is also a high speed bus.

The example DSR client of FIG. 3 also includes sound card (174), which is an example of an I/O adapter specially designed for accepting analog audio signals from a microphone (176) and converting the audio analog signals to digital form for further processing by a VAD engine and a speech parameter extraction engine. Sound card (174) is connected to processor (156) through expansion bus (160), bus adapter (158), and front side bus (162).

The exemplary DSR client (152) of FIG. 3 includes a communications adapter (167) for implementing data communications with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
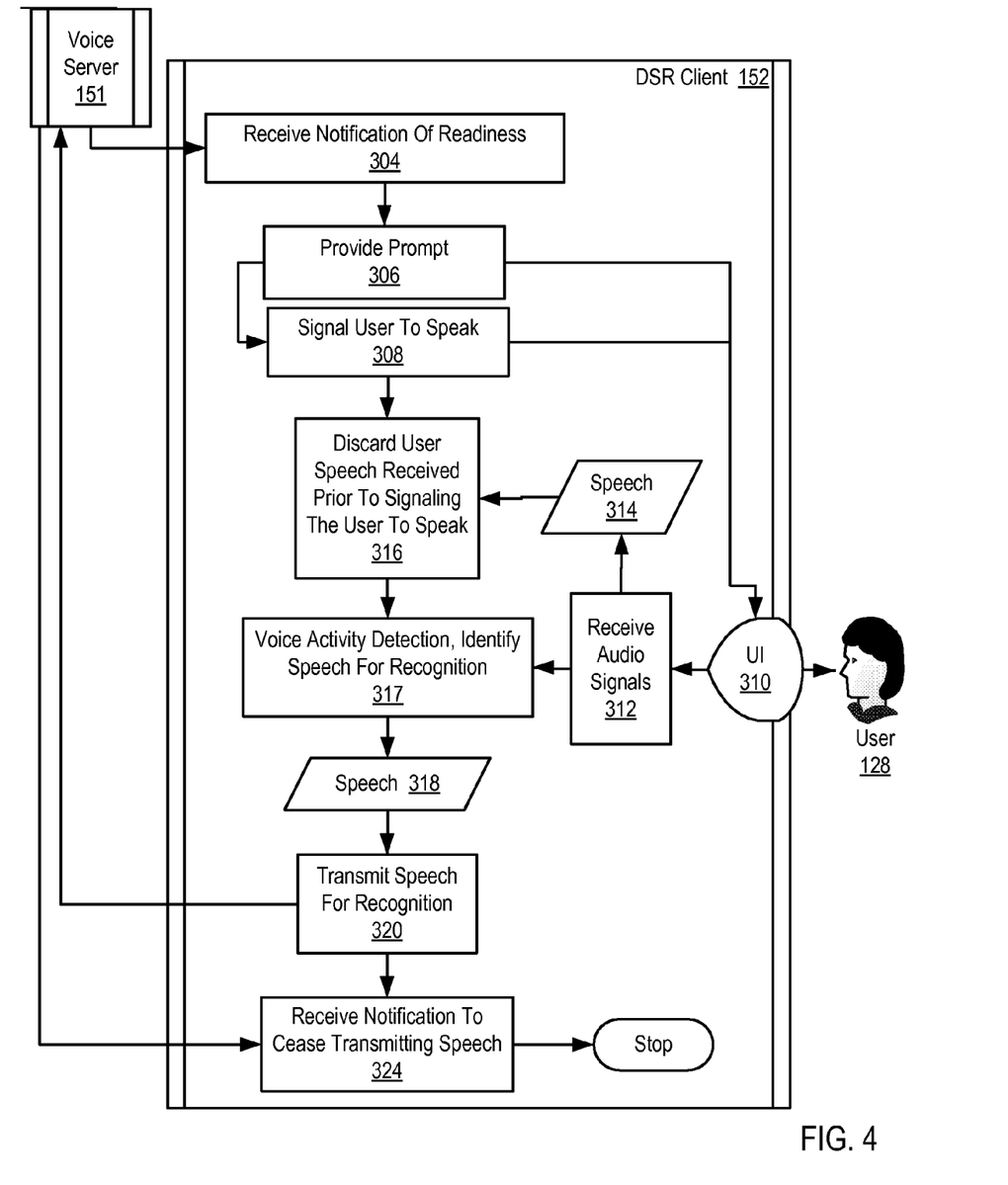
FIG. 4 sets forth a flow chart illustrating an exemplary method of synchronizing distributed speech recognition ('DSR') according to embodiments of the present invention.

For further explanation, FIG. 4 sets forth a flow chart illustrating an exemplary method of synchronizing distributed speech recognition ('DSR') according to embodiments of the present invention that includes receiving (304) in a DSR client (152) notification from a voice server (151) of readiness to conduct speech recognition. As described above, the DSR client (152) in this example is an automated device, automated computing machinery, or a computer program running on an automated device, capable of accepting speech input, parameterizing the speech, and transmitting the parameterized speech to a voice server for recognition. A GUI browser on a laptop, a voice browser on a telephone handset, an online game implemented with Java on a personal computer, for example, all may be implemented as DSR clients. In the method of FIG. 4, receiving (304) in a DSR client (152) notification from a voice server of readiness to conduct speech recognition may be carried out, for example, by receiving notification through an application level data communications protocol. Examples of application level data communications protocols that may be improved with message types that synchronize distributed speech recognition according to embodiments of the present invention include HTTP, SIP, RTP, VOIP, DMSP, WAP, HDTP, and H.323.

The method of FIG. 4 also includes providing (306) by the DSR client (152) to a user (128) a speech prompt advising the user of information to be provided. The method of FIG. 4 also includes, responsive to receiving notification of readiness, signaling (308) the user (128) to speak. In this example, the DSR client (152) both provides (306) a speech prompt through user interface (310) and signals (308) the user (128) to speak through user interface (310). This example distinguishes prompting the user with the kind of information to be provided and signaling the user actually to begin speaking. Examples of speech prompts include:

"You may choose an airline for this flight. At the tone, please speak the name of an airline."

"At the tone, please state the number passengers traveling."

"When the speaker icon turn yellow, please speak the name of your preferred hotel."

The tones and the icon changing color are examples of signals for the user to actually begin speaking. The DSR client may provide the prompts at any time, with no need to wait for the voice server to notify readiness for speech recognition. Such prompts typically are prompts from a VoiceXML application or prompts from VoiceXML segments from an X+V application that have been TTS converted and provided from the voice server to the DSR client as voice prompts. The DSR client signals the user to speak, however, only after receiving from the voice server notification of readiness to conduct speech recognition.

The method of FIG. 4 also includes discarding (316) by the DSR client (152) speech (314) received prior to signaling the user to speak. This conserves bandwidth and improves speech recognition, effectively discarding all audio that is not speech for recognition, and sending to the voice server only speech intended for recognition.

The method of FIG. 4 also includes receiving (312) audio signals—through a sound card like the one illustrated and described above with regard to reference (174) on FIG. 3. The method of FIG. 4 also includes detecting (317) by the DSR client, among the received audio signals, voice activity of a user, and identifying as speech (318) for recognition to be transmitted to the voice server only the audio signals received during voice activity. DSR client (152) may detect voice activity and identify speech for recognition according to voice activity by use of a VAD engine like the one illustrated and described above with regard to reference (184) on FIG. 3.

The method of FIG. 4 also includes transmitting (320) by the DSR client (152), from the DSR client to the voice server (151), speech (318) for recognition. Synchronizing distributed speech recognition is accomplished here because the DSR client (152) transmits speech (318) for recognition only after receiving from the voice server (151) notification of readiness to conduct speech recognition. In this example, DSR client (152) transmits speech with a 'Voice Over Internet Protocol,' or 'VOIP.'

VOIP is a generic term for routing of speech over an IP-based network. The speech data flows over a general-purpose packet-switched network, instead of traditional dedicated, circuit-switched voice transmission lines. Protocols used to carry voice signals over the IP network are commonly referred to as 'Voice over IP' or 'VOIP' protocols. VOIP traffic may be deployed on any IP network, including networks lacking a connection to the rest of the Internet, for instance on a private building-wide local area network or 'LAN.'

Many protocols are used to effect VOIP. The two most popular types of VoIP are effected with the IETF's Session Initian Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet network.

Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for synchronizing distributed speech recognition according to embodiments of the present invention may be encoded with any codec, including, for example:

ARDOR (Adaptive Rate-Distortion Optimised sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

The method of FIG. 4 also includes receiving (324) in the DSR client (152) notification from the voice server (151) to cease transmitting speech. In the method of FIG. 4, receiving (324) in the DSR client (152) notification from the voice server (151) to cease transmitting speech may be carried out explicitly, for example, by receiving notification through an application level data communications protocol. Examples of application level data communications protocols that may be improved with message types that synchronize distributed speech recognition according to embodiments of the present invention include HTTP, SIP, RTP, VOIP, DMSP, WAP, and HDTP. Alternatively, receiving (324) in the DSR client (152) notification from the voice server (151) to cease transmitting speech may be carried out implicitly, for example, by completion of an X+V event or a VoiceXML event associated with a prompt and a transmission of user speech—when the DSR client may infer, that is, may be programmed to determine, that it is time to stop transmitting speech.

Figure 5:
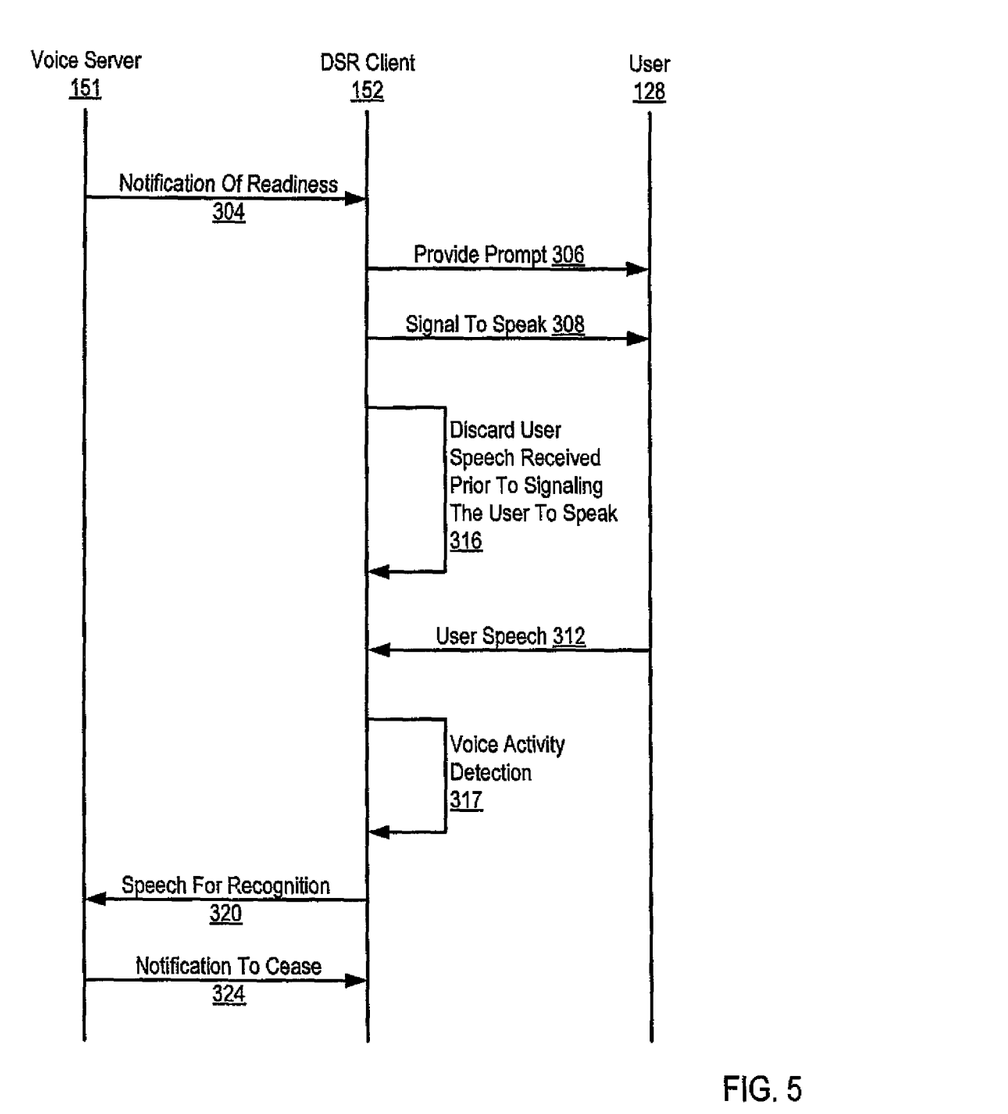
FIG. 5 sets forth a calling sequence diagram illustrating an exemplary method of synchronizing distributed speech recognition according to embodiments of the present invention.

For further explanation, FIG. 5 sets forth a calling sequence diagram illustrating an exemplary method of synchronizing distributed speech recognition according to embodiments of the present invention. The calling sequence illustrated in FIG. 5 is carried out among a voice server (151), a DSR client (152), and user (128). The calling sequence of FIG. 5 begins with a message (304) from voice server (151) to DSR client (152) representing notification of the readiness of the voice server to conduct speech recognition. As readers will recognize in view of the explanations above in this paper, message (304) is implemented in an application level data communications protocol improved to include messages for synchronizing distributed speech recognition, such as, for example, an improved version of HTTP, SIP, RTP, VOIP, DMSP, WAP, or HDTP.

In this example, DSR client (152) next provides to a user (128) a speech prompt (306) advising the user of information to be provided. Then the DSR client (152) signals (308) the user (128) to speak. The DSR client (152) discards (316) speech received prior to signaling the user to speak.

DSR client (152) next receives user speech (312). That is, DSR client (152) receives audio signals through a sound card, like the one illustrated and described above with regard to reference (174) on FIG. 3, where at least some of the audio signals are intended as speech for recognition. DSR client (152) detects (317), among the received audio signals, voice activity of a user and identifies as speech for recognition to be transmitted to the voice server only the audio signals received during voice activity. DSR client (152) may detect voice activity and identify speech for recognition according to voice activity by use of a VAD engine like the one illustrated and described above with regard to reference (184) on FIG. 3.

DSR client (152) then transmits speech for recognition (320) to voice server (151). Synchronizing distributed speech recognition is accomplished here because the DSR client (152) transmits speech for recognition only after receiving from the voice server (151) notification of readiness to conduct speech recognition. In this example, DSR client (152) transmits speech for recognition according to VOIP.

DSR client (152) then receives from the voice server (151) notification (324) to cease transmitting speech. Message (324) is implemented in an application level data communications protocol improved to include messages for synchronizing distributed speech recognition, such as, for example, an improved version of HTTP, SIP, RTP, VOIP, DMSP, WAP, or HDTP.

In view of the explanations set forth above in this paper, readers will recognize that the benefits of synchronizing distributed speech recognition according to various embodiments of the present invention typically include:
- conservation of bandwidth due to reduced transmission of audio not for recognition, and
- improved speech recognition due to echo reduction.

Exemplary embodiments of the present invention are described largely in the context of a fully functional computer system for synchronizing distributed speech recognition. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of synchronizing speech recognition, the method comprising:
   receiving, in a client terminal having access to a voice channel and a data channel distinct from the voice channel, an audio signal including speech of a user;
   processing the audio signal to generate a processed speech signal, the processing comprising filtering the audio signal to remove one or more non-speech portions of the audio signal;
   receiving notification from a voice server of readiness to conduct speech recognition;
   responsive to the notification of readiness to conduct speech recognition, transmitting the processed speech signal over the data channel from the client terminal to the voice server for recognition;
   receiving implicit notification from the voice server to cease transmitting speech, by completion of an X+V event or a VoiceXML event associated with a prompt and a transmission of user speech; and
   responsive to the implicit notification from the voice server to cease transmitting speech, stopping speech transmission.

2. The method of claim 1, wherein the notification of readiness to conduct speech recognition is received through an application level data communications protocol.

3. The method of claim 1, further comprising discarding, by the client terminal, speech received prior to signaling the user to speak.

4. The method of claim 1, further comprising:
   receiving audio signals;
   detecting, by the client terminal, among the received audio signals, voice activity of the user; and
   identifying only audio signals received during the voice activity as speech for recognition to be transmitted to the voice server.

5. The method of claim 1, further comprising:
   providing to the user a speech prompt advising the user of information to be provided; and
   responsive to receiving the notification of readiness, signalling the user to speak.

6. The method of claim 1, wherein the processed speech signal is transmitted using Voice Over Internet Protocol (VOIP).

7. The method of claim 1, wherein the processed speech signal is transmitted over a mobile packet-switched data channel to the voice server for recognition.

8. The method of claim 1, wherein the processed speech signal is transmitted over a cellular packet-switched data channel to the voice server for recognition.

9. An apparatus for synchronizing speech recognition, the apparatus comprising:
   a communications adapter having access to a voice channel and a data channel distinct from the voice channel;
   at least one computer processor; and
   a computer memory operatively coupled to the at least one computer processor, the computer memory having disposed within it computer program instructions that, when executed by the at least one computer processor, perform a method comprising:
   receiving an audio signal including speech of a user;
   processing the audio signal to generate a processed speech signal, the processing comprising filtering the audio signal to remove one or more non-speech portions of the audio signal;
   receiving notification from a voice server of readiness to conduct speech recognition;
   responsive to the notification of readiness to conduct speech recognition, transmitting the processed speech signal over the data channel to the voice server for recognition;
   receiving implicit notification from the voice server to cease transmitting speech, by completion of an X+V event or a VoiceXML event associated with a prompt and a transmission of user speech; and
   responsive to the implicit notification from the voice server to cease transmitting speech, stopping speech transmission.

10. The apparatus of claim 9, wherein the notification of readiness to conduct speech recognition is received through an application level data communications protocol.

11. The apparatus of claim 9, wherein the method further comprises discarding speech received prior to signaling the user to speak.

12. The apparatus of claim 9, wherein the method further comprises:
   receiving audio signals;
   detecting, among the received audio signals, voice activity of the user; and
   identifying only audio signals received during the voice activity as speech for recognition to be transmitted to the voice server.

13. The apparatus of claim 9, wherein the method further comprises:
   providing to the user a speech prompt advising the user of information to be provided; and
   responsive to receiving the notification of readiness, signalling the user to speak.

14. The apparatus of claim 9, wherein the processed speech signal is transmitted using Voice Over Internet Protocol (VOIP).

15. The apparatus of claim 9, wherein the processed speech signal is transmitted over a mobile packet-switched data channel to the voice server for recognition.

16. The apparatus of claim 9, wherein the processed speech signal is transmitted over a cellular packet-switched data channel to the voice server for recognition.

17. A computer program product comprising:
   at least one non-transitory recordable medium encoded with instructions that, when executed, perform a method for synchronizing speech recognition, the method comprising:
      receiving, in an apparatus having access to a voice channel and a data channel distinct from the voice channel, an audio signal including speech of a user;
      processing the audio signal to generate a processed speech signal, the processing comprising filtering the audio signal to remove one or more non-speech portions of the audio signal;
      receiving notification from a voice server of readiness to conduct speech recognition;
      responsive to the notification of readiness to conduct speech recognition, transmitting the processed speech signal over the data channel to the voice server for recognition;
      receiving implicit notification from the voice server to cease transmitting speech, by completion of an X+V event or a VoiceXML event associated with a prompt and a transmission of user speech; and
      responsive to the implicit notification from the voice server to cease transmitting speech, stopping speech transmission.

18. The computer program product of claim 17, wherein the notification of readiness to conduct speech recognition is received through an application level data communications protocol.

19. The computer program product of claim 17, wherein the method further comprises discarding speech received prior to signaling the user to speak.

20. The computer program product of claim 17, wherein the method further comprises:
   receiving audio signals;
   detecting, among the received audio signals, voice activity of the user; and
   identifying only audio signals received during the voice activity as speech for recognition to be transmitted to the voice server.

21. The computer program product of claim 17, wherein the method further comprises:
   providing to the user a speech prompt advising the user of information to be provided; and
   responsive to receiving the notification of readiness, signalling the user to speak.

22. The computer program product of claim 17, wherein the processed speech signal is transmitted using Voice Over Internet Protocol (VOIP).

23. The computer program product of claim 17, wherein the processed speech signal is transmitted over a mobile packet-switched data channel to the voice server for recognition.

24. The computer program product of claim 17, wherein the processed speech signal is transmitted over a cellular packet-switched data channel to the voice server for recognition.

* * * * *